United States Patent
Skov et al.

(10) Patent No.: US 11,057,924 B2
(45) Date of Patent: Jul. 6, 2021

(54) METHOD AND APPARATUS FOR DECOUPLING UPLINK AND DOWNLINK CELL SELECTION

(75) Inventors: Peter Skov, Beijing (CN); Xiao Yi Wang, Wheeling, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/114,625

(22) PCT Filed: Apr. 30, 2011

(86) PCT No.: PCT/CN2011/000766
§ 371 (c)(1),
(2), (4) Date: Oct. 29, 2013

(87) PCT Pub. No.: WO2012/149661
PCT Pub. Date: Nov. 8, 2012

(65) Prior Publication Data
US 2014/0064251 A1 Mar. 6, 2014

(51) Int. Cl.
*H04W 72/14* (2009.01)
*H04J 11/00* (2006.01)
*H04W 52/50* (2009.01)
*H04L 5/00* (2006.01)
*H04W 36/00* (2009.01)
*H04W 72/04* (2009.01)

(52) U.S. Cl.
CPC ......... *H04W 72/14* (2013.01); *H04J 11/0053* (2013.01); *H04L 5/0098* (2013.01); *H04W 36/0005* (2013.01); *H04W 52/50* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 7,742,449 B2* | 6/2010 | Matsuki | | 370/331 |
| 8,780,853 B2* | 7/2014 | Kalhan | | H04W 72/0426 |
| | | | | 370/330 |
| 2002/0016180 A1* | 2/2002 | Derosier | | H04W 48/04 |
| | | | | 455/522 |
| 2004/0219901 A1* | 11/2004 | Loke | | 455/318 |
| 2007/0242669 A1* | 10/2007 | Achard et al. | | 370/390 |
| 2010/0177654 A1* | 7/2010 | Charbit | | H04B 1/7087 |
| | | | | 370/252 |

(Continued)

FOREIGN PATENT DOCUMENTS

CN 101873644 A 10/2010
SE WO 2012/113449 A1 * 2/2011 ............... H04L 5/00

(Continued)

OTHER PUBLICATIONS

3GPP TS 36.213 V10.1.0 (Mar. 2011); 3rd Generation Partnership Project; Technical Specification Group Radio Access Network; Evolved Universal Terrestrial Radio Access (E-UTRA); Physical layer procedures (Release 10).

*Primary Examiner* — Jeffrey M Rutkowski
*Assistant Examiner* — Ning Li
(74) *Attorney, Agent, or Firm* — Harrington & Smith

(57) ABSTRACT

A method includes receiving information at a user equipment from a first apparatus, the information indicating to the user equipment is to communicate with a second apparatus.

15 Claims, 7 Drawing Sheets

(56) References Cited

U.S. PATENT DOCUMENTS

| | | | | |
|---|---|---|---|---|
| 2011/0243108 A1* | 10/2011 | Park | .................... | H04W 48/16 |
| | | | | 370/336 |
| 2011/0300856 A1* | 12/2011 | Aminaka | .......... | H04W 72/1215 |
| | | | | 455/422.1 |
| 2011/0312316 A1* | 12/2011 | Baldemair | ............ | H04W 24/10 |
| | | | | 455/422.1 |
| 2012/0044922 A1* | 2/2012 | Ishii | ........................ | H04L 5/001 |
| | | | | 370/338 |
| 2012/0213089 A1* | 8/2012 | Shi | .......................... | H04L 5/001 |
| | | | | 370/241 |
| 2012/0213109 A1* | 8/2012 | Xu | .......................... | H04B 7/024 |
| | | | | 370/252 |
| 2013/0034067 A1* | 2/2013 | Umesh | ................ | H04W 74/002 |
| | | | | 370/329 |
| 2013/0331115 A1* | 12/2013 | Falconetti | ......... | H04W 72/0426 |
| | | | | 455/452.2 |
| 2013/0337795 A1* | 12/2013 | Falconetti | ............... | H04L 5/001 |
| | | | | 455/419 |

FOREIGN PATENT DOCUMENTS

| WO | WO 2008/134546 A2 | 11/2008 |
|---|---|---|
| WO | WO 2009/099843 A1 | 8/2009 |

* cited by examiner

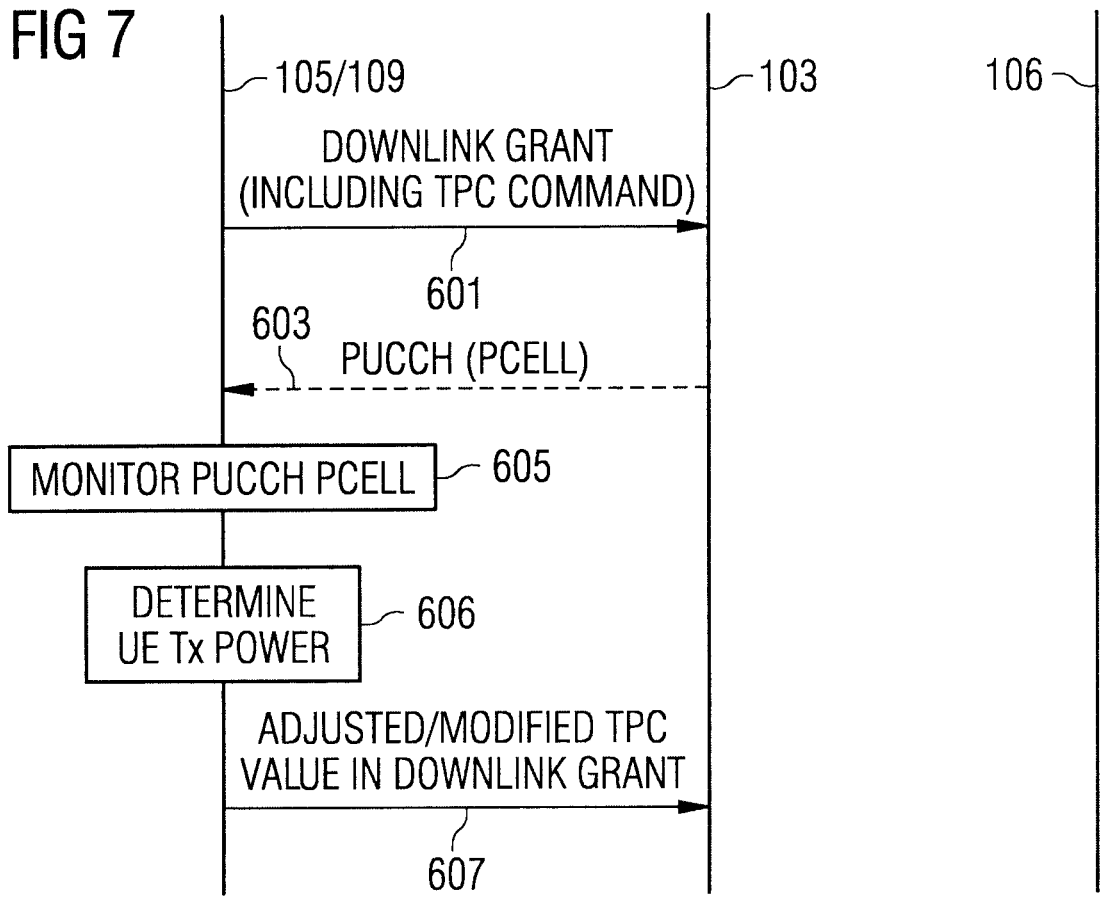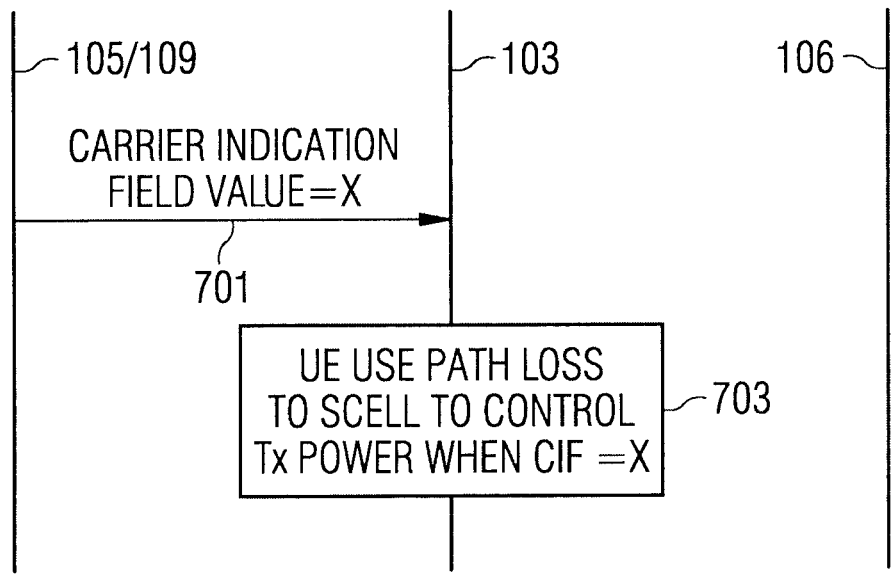

METHOD AND APPARATUS FOR DECOUPLING UPLINK AND DOWNLINK CELL SELECTION

The application relates a method and apparatus and in particular but not exclusively to a method and apparatus for use in cell aggregation in communication systems.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user equipment, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

One technique of communicating over a wireless interface relies on combining the results of detecting a transmission from a communications device at a plurality of access nodes or detecting a transmission based on signals received at a plurality of access nodes or more generally involving a plurality of access nodes in the detection of a transmission. This is commonly known as coordinated multipoint transmission (CoMP). There has been identified the challenge of controlling the power of transmissions from a communication device in such a communications technique. Particularly where CoMP is in heterogeneous network scenarios where there is a centralised processing unit, for example where there is a single macro eNB and several remote radio heads.

Under such scenarios, assigning cell identification (cell ID) values for the Remote Radio Head (RRH) is difficult. For example using cross cell scheduling to transmit the primary cell downlink from a macro cell and transmitting a secondary cell uplink in a pico cell, the packet uplink control channel (PUCCH) is still transmitted in the primary cell uplink, and carrier aggregation framework does not support to have the PUCCH on the secondary cell. Considering that the secondary cell and primary cell are transmitted using the same carrier and that the eNB can use different cell IDs for receiving which means that the user equipment can use any cell ID for transmission then the main difference between transmitting in the primary cell and second cell is that the user equipment transmit power setting as the path loss to the two cells is different. For example should the macro cell (primary cell) be used but the user equipment very close to the pico cell (secondary cell), a very large interference can be created and could lead to network capacity reduction and instability. Furthermore, for heterogeneous networks, it is well known that the user equipment cell selection for optimising downlink capacity can provide a different result that if the uplink capacity is used. In other words where the user equipment selects the optimal cell for downlink transmission, this cell will in many cases not be the optimal cell for uplink transmission. For example where different node types have different downlink transmit powers while the user equipment of course have a similar transmit power, the typical macro and pico deployments are such that the macro eNB can transmit power per cell at 46 dBms for every 10 MHz while the typical pico cell has 30 dBms per 10 MHz. Although 3GPP Standards support the introduction of cell selection bias, this cannot be very large before the downlink signal quality degrades such that it is difficult to guarantee downlink control signalling reliability.

According to an aspect, there is provided a method comprising receiving information at a user equipment from a first apparatus, the information indicating to the user equipment is to communicate with a second apparatus.

The method may further comprise: monitoring at least one control channel from the first apparatus wherein the at least one control channel comprises the information.

The information may be contained within a downlink control information grant message and may comprise at least one of: a cell ID value; a carrier ID field value; and a transmission power setting.

The method may further comprise: configuring the user equipment to receive from the first apparatus and to transmit to the second apparatus dependent on the information.

The method may further comprise associating each apparatus with one or more logical cell values, each logical cell being associated to a carrier resource and at least two logical cells associated to the same carrier resource.

The carrier resource may comprise at least one of: time period; frequency; code; and spatial coding.

The method may further comprise associating the user equipment with a logical cell value, wherein the user equipment associated logical cell value is decoupled from the logical cell value associated with the apparatus to which the user equipment is configured to transmit.

Configuring the user equipment to receive from the first apparatus and to transmit to the second apparatus dependent on the information may further comprise performing measurements related to the second apparatus for the configuration of transmission power level for transmission to the second apparatus.

According to a second aspect there is provided a method comprising: transmitting information to a user equipment from a first apparatus, the information indicating to the user equipment is to communicate with a second apparatus.

The information may be contained within a downlink control information grant message and may comprise at least one of: a cell ID value; a carrier ID field value; and a transmission power setting.

The method may further comprise associating each apparatus with one or more logical cell values, each logical cell being associated to a carrier resource and at least two logical cells associated to the same carrier resource.

The carrier resource may comprise at least one of: time period; frequency; code; and spatial coding.

The method may further comprise associating the user equipment with a logical cell value, wherein the user equipment associated logical cell value is decoupled from the logical cell value associated with the apparatus to which the user equipment is configured to transmit.

The method may further comprise configuring the information, wherein the information is dependent on measurements related to the second apparatus for the configuration of transmission power level for transmission to the second apparatus.

According to a third aspect there is provided a method comprising associating each apparatus with one or more logical cell values, each logical cell being associated to a carrier resource and at least two logical cells associated to the same carrier resource.

The carrier resource may comprise at least one of: time period; frequency; code; and spatial coding.

The method may further comprise associating a user equipment with a logical cell value, wherein the user equipment associated logical cell value may be decoupled from the logical cell value associated with the apparatus to which the user equipment is configured to transmit.

The method may further comprise performing related to the second apparatus for the configuration of transmission power level for transmission to the second apparatus, and configuring a user equipment to receive from the first apparatus and to transmit to the second apparatus dependent on the information.

According to a fourth aspect there is provided apparatus comprising means for receiving information from a second apparatus, the information indicating to the apparatus is to communicate with a third apparatus.

The apparatus may further comprise: means for monitoring at least one control channel from the second apparatus wherein the at least one control channel comprises the information.

The information may be contained within a downlink control information grant message and may comprise at least one of: a cell ID value; a carrier ID field value; and a transmission power setting.

The apparatus may further comprise: means for configuring the apparatus to receive from the second apparatus and to transmit to the third apparatus dependent on the information.

The apparatus may further comprise means for associating each of the second and third apparatus with at least one logical cell values, each logical cell being associated to a carrier resource and wherein at least two logical cells associated to the same carrier resource.

The carrier resource may comprise at least one of: time period; frequency; code; and spatial coding.

The apparatus may further comprise means for associating the apparatus with a logical cell value, wherein the apparatus associated logical cell value is decoupled from the logical cell value associated with the second and/or third apparatus to which the apparatus is configured to transmit.

According to a fifth aspect there is provided apparatus comprising: means for transmitting information to a user equipment, the information indicating to the user equipment is to communicate with a second apparatus.

The information may be contained within a downlink control information grant message and may comprise at least one of: a cell ID value; a carrier ID field value; and a transmission power setting.

The apparatus may further comprise means for associating each apparatus with one or more logical cell values, each logical cell associated to a carrier resource and wherein at least two apparatus are associated to the same carrier resource.

The carrier resource may comprise at least one of: time period; frequency; code; and spatial coding.

The apparatus may further comprise means for associating the user equipment with a logical cell value, wherein the user equipment associated logical cell value is decoupled from the logical cell value associated with the apparatus to which the user equipment is configured to transmit.

The apparatus may further comprise means for configuring the information, wherein the information is dependent on measurements related to the second apparatus for the configuration of transmission power level for transmission to the second apparatus.

According to a sixth aspect there is provided apparatus comprising means for associating at least two apparatus with one or more logical cell values, each logical cell being associated to a carrier resource and at least two logical cells associated to the same carrier resource.

The apparatus may further comprise means for associating a user equipment with a logical cell value, wherein the user equipment associated logical cell value may be decoupled from the logical cell value associated with the apparatus to which the user equipment is configured to transmit.

The apparatus may further comprise means for performing measurements related to the second apparatus for the configuration of transmission power level for transmission to the second apparatus.

According to a seventh aspect there is provided an apparatus comprising at least one processor and at least one memory including computer program code, the at least one memory and computer program code configured, with the at least one processor, to cause the apparatus to receive information at a user equipment from a second apparatus, the information indicating to the apparatus is to communicate with a third apparatus.

The apparatus may be further caused to perform: monitoring at least one control channel from the second apparatus wherein the at least one control channel comprises the information.

The information may be contained within a downlink control information grant message and may comprise at least one of: a cell ID value; a carrier ID field value; and a transmission power setting.

The apparatus may be further caused to perform: configuring the apparatus to receive from the second apparatus and to transmit to the third apparatus dependent on the information.

The apparatus may be further caused to perform associating each of the second and third apparatus with one or more logical cell values, each logical cell being associated to a carrier resource and at least two logical cells associated to the same carrier resource.

The carrier resource may comprise at least one of: time period; frequency; code; and spatial coding.

The apparatus may be further caused to perform associating each apparatus with one or more logical cell values, each logical cell being associated to a carrier resource and at least two logical cells associated to the same carrier resource.

The carrier resource may comprise at least one of: time period; frequency; code; and spatial coding.

According to an eighth aspect there is provided an apparatus comprising at least one processor and at least one memory including computer program code, the at least one memory and computer program code configured, with the at least one processor, to cause the apparatus to transmit information to a user equipment from a first apparatus, the information indicating to the user equipment is to communicate with a second apparatus.

The information may be contained within a downlink control information grant message and may comprise at least one of: a cell ID value; a carrier ID field value; and a transmission power setting.

The apparatus may be further caused to perform associating each apparatus with one or more logical cell values, each logical cell being associated to a carrier resource and at least two logical cells associated to the same carrier resource.

The carrier resource may comprise at least one of: time period; frequency; code; and spatial coding.

The apparatus may be further caused to perform associating the user equipment with a logical cell value, wherein the user equipment associated logical cell value is decoupled from the logical cell value associated with the apparatus to which the user equipment is configured to transmit.

The apparatus may be further caused to perform configuring the information, wherein the information is dependent on measurements related to the second apparatus for the configuration of transmission power level for transmission to the second apparatus.

According to a ninth aspect there is provided an apparatus comprising at least one processor and at least one memory including computer program code, the at least one memory and computer program code configured, with the at least one processor, to cause the apparatus to associate at least two apparatus with one or more logical cell values, each logical cell being associated to a carrier resource and at least two logical cells associated to the same carrier resource.

The carrier resource may comprise at least one of: time period; frequency; code; and spatial coding.

The apparatus may be further caused to perform associating a user equipment with a logical cell value, wherein the user equipment associated logical cell value is decoupled from the logical cell value associated with the apparatus to which the user equipment is configured to transmit.

The apparatus may be further caused to perform determining measurements related to the second apparatus for the configuration of transmission power level for transmission to the second apparatus.

A computer program comprising computer executable instructions which when run on one or more processors perform the method of any of those described herein.

A user equipment may comprise the apparatus.

A first base station may comprise the first apparatus and a second base station may comprise the second apparatus.

It should be appreciated that any feature of any aspect may be combined with any other feature of any other aspect.

Embodiments will now be described in further detail, by way of example only, with reference to the following examples and accompanying drawings, in which:

FIG. 7 shows a method of controlling transmission power from a user equipment according to some embodiments;

FIGS. 8 to 10 shows a method of controlling transmission power from a user equipment according to some additional embodiments;

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

Figure 1:
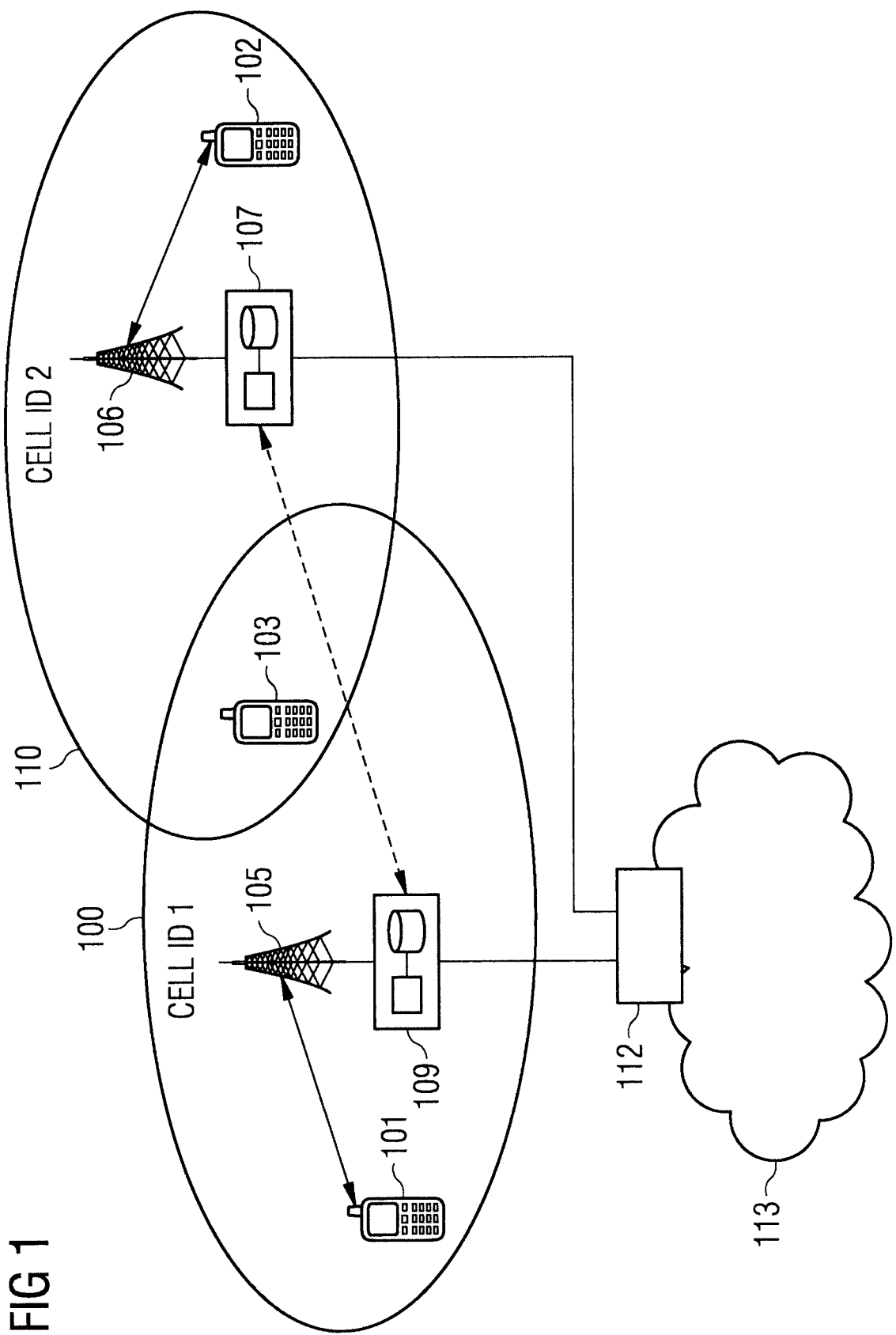
FIG. 1 shows a schematic diagram of a network according to some embodiments.

A communication device or user equipment 101, 102, 103, is typically provided wireless access via at least one base station or similar wireless transmitter and/or receiver node of an access system. In FIG. 1 two neighbouring and overlapping access systems or radio service areas 100, 110 are shown being provided by base stations 105, 106.

However, it is noted that instead of two access systems, any number of access systems can be provided in a communication system. An access system can be provided by a cell of a cellular system or another system enabling a communication device to access a communication system. A base station site 105, 106 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each communication device 101, 102, 103, and base station 105, 106 may have one or more radio channels open at the same time and may send signals to and/or receive signals from more than one source.

Base stations 105, 106, are typically controlled by at least one appropriate controller apparatus 109, 107 so as to enable operation thereof and management of mobile communication devices 101, 102, 103, in communication with the base stations 105, 106, 108. The control apparatus 107, 109 can be interconnected with other control entities. The control apparatus 107, 109 can typically be provided with memory capacity 301 and at least one data processor 302. The control apparatus 107, 109 and functions may be distributed between a plurality of control units. In some embodiments, each base station 105, 106 can comprise a control apparatus 109, 107. In alternative embodiments, two or more base stations may share a control apparatus. Currently LTE does not have a separate radio network controller. In some embodiments the control apparatus may be respectively provided in each base station.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts a first cell 100 and a second cell 110. In this example the first cell 100 is a wide area base station cell 105, which can be a macro-eNB. The macro-eNB 105 transmits and receives data over the entire coverage of the cell 100. The second cell 110 in this example is a pico-cell or in some other embodiments can be any suitable small area network node such as Home eNBs (HeNB) (femto cells) or pico eNodeBs (pico-eNB) 106. HeNBs may be configured to support local offload and may support any UE or UEs belonging to a closed subscriber group (CSG) or an open subscriber group (OSG) and transmit and receive data over the coverage area of the second cell 110.

In some embodiments LTE-Advanced network nodes can comprise a combination of wide area network nodes and small area network nodes deployed using the same frequency carriers (e.g. co-channel deployment). The coverage of the smaller area base station is generally smaller than the coverage of the wide area base stations. The coverage provided by smaller area nodes (pico or femto nodes) may overlap with the coverage provided by the macro-eNBs. Pico eNBs can be used to extend coverage of the macro-eNBs outside the original cell coverage of the macro-eNBs. The pico eNB can also be used to provide cell coverage in "gaps" or "shadows" where there is no coverage within the existing cells and/or may serve "hot spots". In some embodiments, the smaller area node can be a femto or Home eNB which can provide coverage for a relatively small area such as the home. Some environments may have both pico and femto cells.

As shown, the radio service areas can overlap. Thus signals transmitted in an area can interfere with communications in another area.

The communication devices 101, 102, 103, can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). Further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

In FIG. 1 the base stations 105, 106, of the access systems can be connected to a wider communications network 113. The controller apparatus 107, 109 may be provided for coordinating the operation of the access systems. A gateway function 112 may also be provided to connect to another network via the network 113. The smaller base station 108 can also be connected to the other network by a separate gateway function 111. The base stations 105, 106, can in some embodiments be connected to each other by a communication link for sending and receiving data. The communication link can be any suitable means for sending and receiving data between the base stations 105, 106 and in some embodiments the communication link is an X2 link.

The other network may be any appropriate network. A wider communication system may thus be provided by one or more interconnect networks and the elements thereof, and one or more gateways may be provided for interconnecting various networks.

Figure 2:
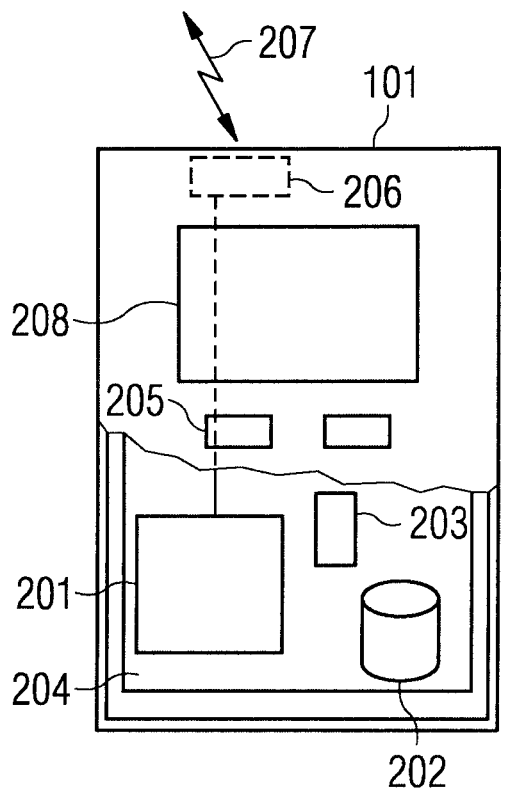
FIG. 2 shows a schematic diagram of a mobile communication device according to some embodiments.

The communication devices will now be described in more detail with reference to FIG. 2. FIG. 2 shows a schematic, partially sectioned view of a communication device 101 that a user can use for communication. Such a communication device is often referred to as user equipment (UE) or terminal. An appropriate communication device may be provided by any device capable of sending and receiving radio signals. The communication device may be mobile. Non-limiting examples of a communication device include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The communication device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
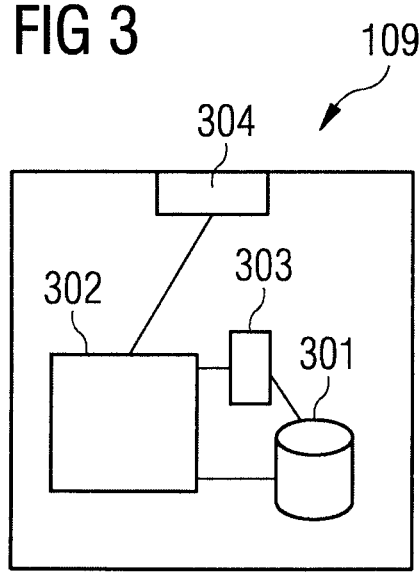
FIG. 3 shows a schematic diagram of a control apparatus according to some embodiments.

FIG. 3 shows an example of a control apparatus 109 (or 107) for a communication system, for example to be coupled to, included in and/or for controlling a station of an access system. In some embodiments the base stations 105, 106, each comprise a separate control apparatus, such as shown in FIG. 3. The control apparatus 109 can be arranged to provide control of communications by communication devices that are in the service area of the system. The control apparatus 109 can be configured to provide control functions in association with generation and communication of transmission patterns and other related information and for muting signals by means of the data processing facility in accordance with certain embodiments described below. For this purpose the control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

Figure 4:
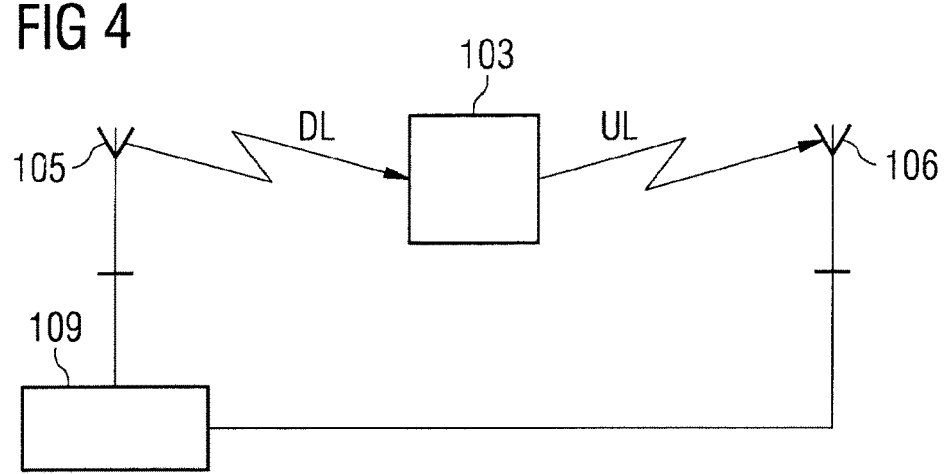
FIG. 4 shows schematically the network according to some embodiments.

With respect to FIG. 4, an example implementation of embodiments of the application are shown wherein the macro cell base station 105 and its associated controller 109 which is further coupled to the pico cell base station 106. Furthermore the macro cell base 105 is configured to communicate to a user equipment 103 operating within the range of the macro cell in such a way that the downlink between the macro cell and user equipment 103 is able to transmit control and signal information from the macro cell base station antenna to the user equipment 103. Similarly the user equipment 103 is configured to transmit via an uplink to the pico cell base station 106 and also in some embodiments transmit at least control information via a control channel to the macro cell base station 105. In such an environment it would be understood that the heterogeneous network in attempting to optimise downlink capacity would produce a different result than if uplink capacity is considered as the various node types may have different downlink transmit powers. Therefore in some embodiments of the application, cell aggregation between the pico cell and macro cell is used to allow uplink transmissions from the user equipment to be received by the pico cell and downlink transmissions transmitted via the macro cell.

Figure 5:
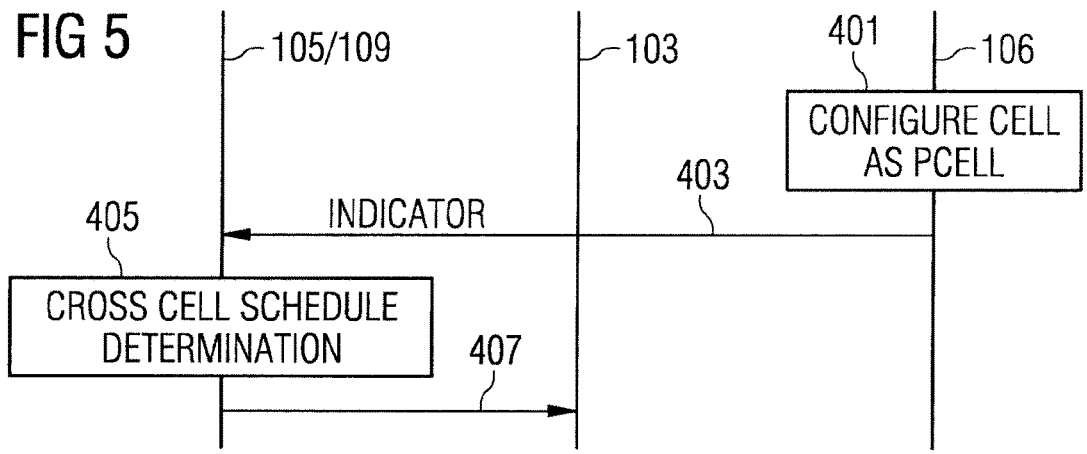
FIG. 5 shows a first method of an embodiment.

With respect to FIG. 5 a first example is shown whereby the pico cell base station 106 can be configured to configure itself as the primary cell or Pcell. The operation of configuring the cell as the Pcell is shown in FIG. 5 by step 401. Furthermore in some embodiments the pico cell 106 can be configured to transmit to the controller of the macro cell an indicator indicating that it is being configured as the Pcell for a user equipment. The macro cell/macro cell controller 109 can thus receive the indicator from the pico cell.

The transmission of the indicator from the pico cell to the macro cell is shown in FIG. 5 by step 403.

The macro cell on receiving the indicator from the pico cell can then perform cross cell scheduling. It would be understood that in some embodiments the macro cell and the pico cell operate using the same range of transmission resources whether these transmission resources are time periods, frequency bands such or codes. In these examples, we will therefore describe the primary and secondary cells as operating on the same carrier and as such these cross cell scheduling is described rather than the cross carrier scheduling as would occur where the pico cell and macro cell transmit using different transmission resources.

The operation of determining the cross cell scheduling is shown in FIG. 5 by step 405.

Furthermore in some embodiments the macro cell controller can be configured to transmit via macro cell base station an indicator to the user equipment informing the user equipment of the cross cell scheduling in such a way that the user equipment can control the uplink to the pico cell base station. The operation of informing the user equipment from the secondary cell or macro cell is shown in FIG. 5 by step 407. In some embodiments this indicator can for example include defining the cell ID value for the UE to differ from the cell ID value used by UE communicating only to either the macro cell base station or pico cell base station.

Figure 6:
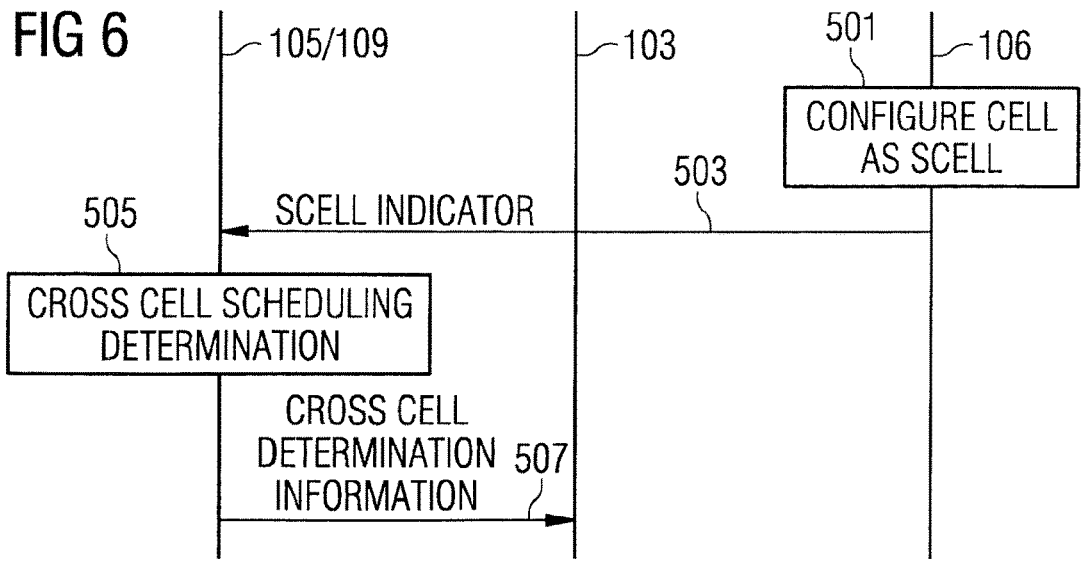
FIG. 6 shows a further method of an embodiment.

In some embodiments as shown in FIG. 6 the pico cell base station 106 can configure itself to operate as a secondary cell or Scell. The operation of configuring the pico cell base station as the secondary cell for the UE is shown in FIG. 6 by step 501.

The pico cell base station can then communicate to the macro cell controller an indicator defining the pico cell as a secondary cell with respect to at least one user equipment. The transmission of the secondary cell indicator message is shown in FIG. 6 by the step 503.

The macro cell controller 109 can then define the macro cell as the primary cell or Pcell and then determine the cross cell scheduling.

The determination of cross cell scheduling having determined that the macro cell is the primary cell and the pico cell is the secondary cell is shown in FIG. 6 by step 505.

Having determined the cross cell scheduling information, the primary cell in other words the macro cell 105 can then communicate the cross cell determination information to the user equipment. For example as shown in FIG. 6, a message 507 is passed from the macro cell to the user equipment 103 defining the cross cell determination information which can be used by the user equipment, for example to define the uplink power transmission or transmission resource information. Once again the information can comprise a separate UE cell ID value that would be defined for using either the macro cell or pico cell purely.

Thus the concept of receiving from a further node or another node and transmitting through a different node should in some embodiments allow a system configuration to be much more flexible than currently able to be defined. In other words it permits the decoupling of uplink and downlink cell selection which allows separate optimizations for uplink and downlink communications. For example as previously discussed the downlink may have greater capacity/signal error levels when transmitted from the macro link.

With respect to FIG. 7 a detail of the operation of embodiments of the application are shown. One of the cross cell scheduling determination control functions can attempt to address the issue that when using cross cell scheduling to transmit a primary cell downlink from the macro cell base station 105 and transmit secondary cell uplink in the pico cell base station 106, the PUCCH (physical uplink control channel) is transmitted in the primary cell uplink, for example to the macro cell base station. It would understood that in an optimal case the physical uplink control channel information should also be transmitted to the secondary cell (for example the pico cell). However the current carrier aggregation frame work system does not support such a feature. Furthermore when considering that a secondary cell and primary cell are transmitted on the same carrier and that the eNB can use different cell ID values for receiving means that the user equipment can use any cell identification value for transmission then the difference between transmitting in the primary cell and secondary cell being the user equipment transmit power setting as the path loss to the two cells is different. For example where the primary cell is used but the user equipment is very close to the secondary cell, a large interference can be created leading to network capacity reduction and instability issues. Therefore in order to overcome this the overarching principle is to decouple the cell identification value (cell ID) used for the physical downlink control channel (PDCCH) and the physical uplink control channel (PUCCH)/physical uplink shared channel (PUSCH) and in this way allow simpler coordination of uplink transmission between different cells. In some embodiments the primary cell or Pcell such as the macro cell can communicate to the user equipment, such information as a downlink grant including the transmit power control commands to be used by the user equipment.

The transmission of the downlink grant message from the macro cell to the user equipment is shown in FIG. 7 by step 601.

Based on the transmit power control commands in the downlink grant message the user equipment can then control its power transmission for the uplink which can be received by the primary (or macro cell in this example) in the form of a physical uplink control channel (PUCCH) message.

The controller 109 can then monitor the PUCCH message received in the primary cell to monitor the power level received.

The operation of monitoring the PUCCH level for the primary cell is shown in FIG. 7 by step 605.

Furthermore dependent on the PUCCH power level in the primary cell the controller 109 can then determine the user equipment transmission power in such a way that it reduces the probability of interference with the secondary cell (the pico cell in this example) leading to network capacity reduction.

The determination of the user equipment transmission power is shown in FIG. 7 by step 606.

Furthermore the macro cell controller 109 can then transmit the adjusted or modified transmission power, for example by using a TPC command value in the further downlink grant message. The operation of passing a modified or adjusted TPC value is shown in FIG. 7 by step 607.

In some embodiments further autonomous performance can be performed such that the macro cell base station 105 can request the user equipment 103 to use path loss data to the secondary cell to control the transmission power rather than continuously monitoring the transmission power at the primary cell.

With respect to FIG. 8 a first detailed method embodiment of a path loss to secondary cell implementation is shown. In such an embodiment the primary cell controller 109 can be configured to transmit via the primary cell base station 105 a carrier indication field (CIF) with a specific value to the user equipment 103.

The transmission of a carrier indication field message from the macro cell to the user equipment is shown in FIG. 8 by step 701.

Furthermore in some embodiments the user equipment 103 can receive the carrier indication field value and when receiving a carrier indication field value of a defined value, for example X, the user equipment 103 can then be configured such that the transmission power is determined dependent on the path loss value to the secondary cell.

Figure 9:
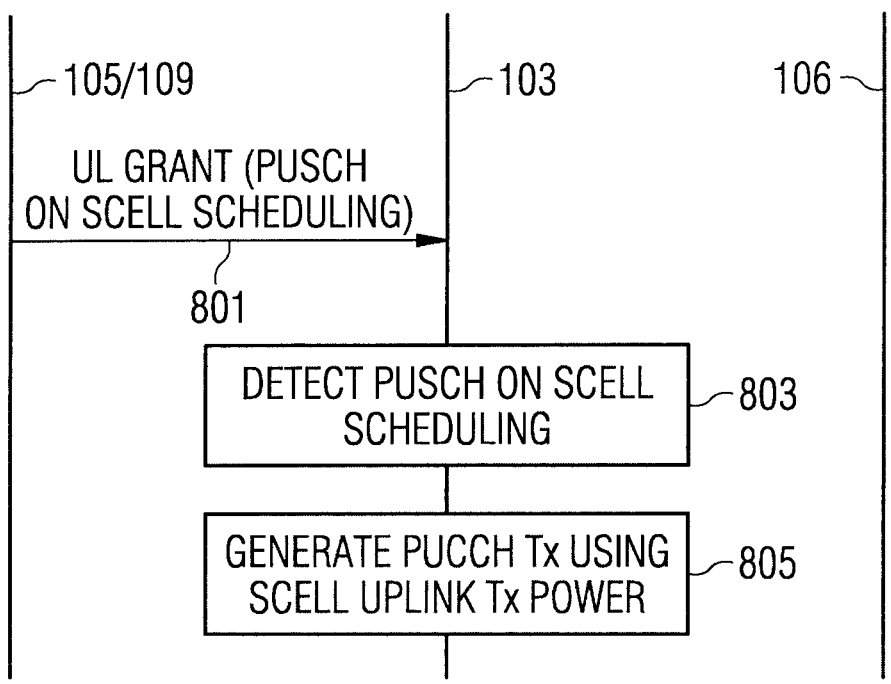

With respect to FIG. 9 a further method implementation embodiment is shown. In such embodiments the macro cell or primary cell controller 109 is configured to transmit an uplink grant message from the macro cell base station 105 to the user equipment 103. The uplink grant message can furthermore be configured to comprise a physical uplink shared channel (PUSCH) secondary cell scheduling information message. The operation of passing a message from the macro cell to the user equipment of uplink grant information is shown in FIG. 9 by step 801.

Furthermore the user equipment 103 on receiving the uplink grant information and in particular the physical uplink shared channel (PUSCH) secondary cell scheduling information detect this information indicating the user equipment is permitted to transmit over a physical uplink shared channel (PUSCH) on the second cell. The detection of such a grant is shown in FIG. 9 by step 803.

Furthermore the user equipment on determining that it has been granted permission to use the physical uplink shared channel (PUSCH) to the secondary cell (or pico cell in this example), the user equipment can be configured to transmit the physical uplink control channel (PUCCH) using the secondary cell uplink transmit power. The generation of the physical uplink control channel (PUCCH) transmission using the secondary cell uplink transmission power by the user equipment is shown in FIG. 9 by step 805. In such an embodiment the power control would be implicit in terms of the latest received uplink grant. In other words no explicit indication is required between the primary cell and the user equipment that the user equipment is to use the path loss to the secondary cell to control the transmission power.

Figure 10:
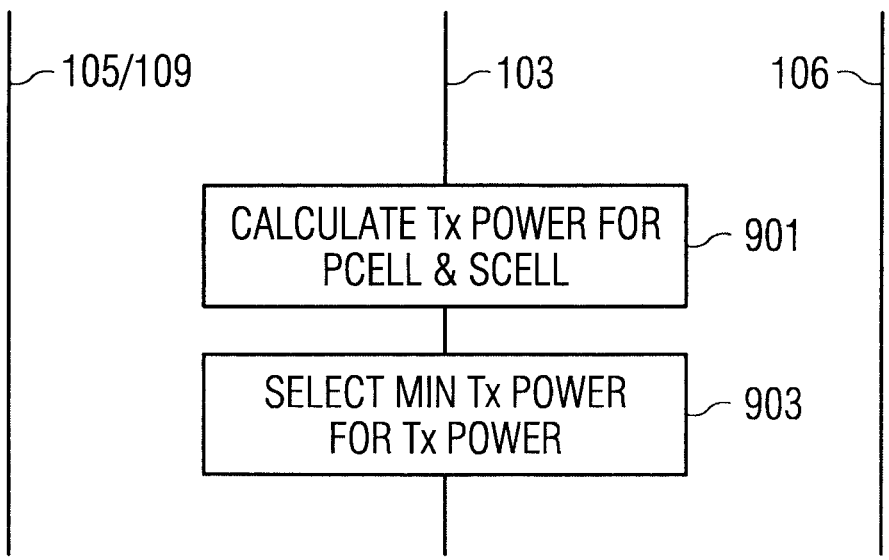

With respect to FIG. 10 a further embodiment example is shown. In such an embodiment the user equipment can calculate the transmit power required for both primary and secondary cells. In other words the user equipment can determine a first calculation for the transmission power for an uplink to the primary cell and also at the same time or within the same period of time calculate or determine the transmission power required for the secondary cell based on power loss information. The transmission power calculation can be any suitable transmission power calculation.

The calculation of the transmission power for both the primary and secondary cells by the user equipment is shown in FIG. 10 by step 901.

The user equipment can then in some embodiments select the minimum transmission power to be the transmission power used for the uplink and both the physical uplink control channel and physical uplink shared channel.

The operation of selecting the minimum transmission power is shown in FIG. 10 by step 903.

In such embodiments the power control not only of the physical uplink control channel can be accurately controlled but also the power control of the physical random access channel (PRACH) can also be improved or more optimized as without coordination between the cells the signal can cause severe interference. Typically the path loss information used to determine from which group a preamble is selected from where the path loss typically refers to the path loss to the serving controller (or eNB) based on the downlink transmission however it would be understood that in such embodiments as described herein, the term path loss should be extended as being from the primary cell transmission point to the secondary cell transmission point such that the uplink PRACH is carried on the link to the pico cell. Similarly as defined in the 3GPP Standard 36.213 the preamble transmission power $P_{PRACH}$ is determined as $P_{PRACH}=\min\{P_{CMAX},$ PREAMBLE_RECEIVED_TARGET_POWER+PL$\}$_[dBm] where $P_{CMAX}$ is the configured UE transmitted power and PL is the downlink path loss estimate calculated at the user equipment. The value of the preamble received target power can thus be defined to the primary cell but in embodiments of the application should be based on the target power value to the pico cell in a manner similar to that described with regards to the PUCCH.

Figure 11:
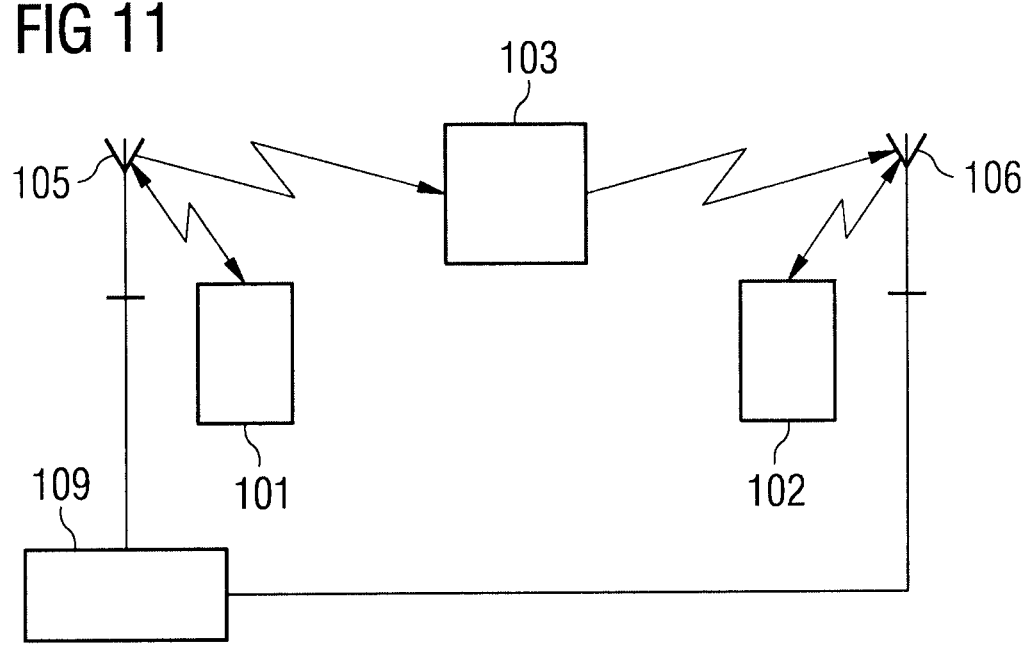
FIG. 11 shows schematically a further network suitable for implementing embodiments of the application.

Furthermore in some embodiments there can be envisaged systems wherein some of the users are configured to use the pico cell as the primary cell whereas others are configured to use the macro cell as the primary cell. This for example can be shown in FIG. 11 wherein the user equipment 101 defines the macro cell as the primary cell, the user equipment 102 defines the pico cell as the primary cell, and the user equipment 103 can define the pico cell as either the primary cell or the secondary cell. In such embodiments the eNB or cell controller 109 can be configured to define the cell ID independent on the uplink or downlink to the cell with respect to the user equipment.

Thus in some embodiments where the macro cell is assigned a cell ID (or identification value) of 1 and thus UE coupled only to the macro cell have an associated cell ID=1, and the pico cell 106 is assigned the cell identification value of 2 and thus UE coupled only to the pico cell have an associated cell ID=2, the user equipment 103 can be associated a cell value of 3 where cross cell scheduling is required as the UE is coupled to both the macro and pico cell and as such decouple the cell ID used for PDCCH and PUCCH/PUSCH transmissions. Thus for example the user equipment 103 with a cell ID=3 and can be configured such that the PUCCH physical resource block (PRB) assignment 4 can be defined as being X for cell ID values of 3.

Figure 12:
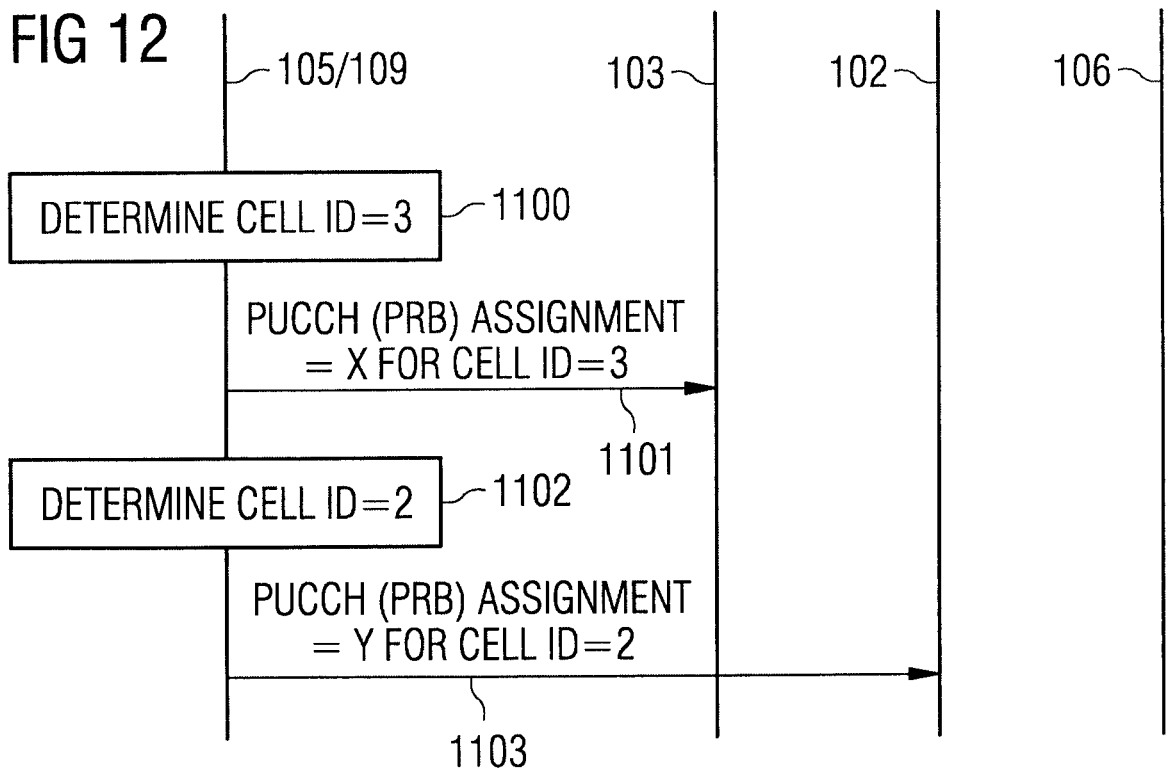
FIG. 12 shows a method of resource allocation according to come embodiments of the application.

The determination of the cell ID=3 is shown in FIG. 12 by step 1100 and the operation of defining or assigning the physical resource blocks for the physical uplink control channel (PUCCH) for a certain cell ID=3 is shown in FIG. 12 by step 1101.

Furthermore when the controller determines that the user equipment is using cell ID=2 such as for user equipment 102 then the physical resource block physical uplink control channel assignment can be defined (as being Y) for the cell ID=2.

The operation of determining the cell ID value (for a user equipment)=2 is shown in FIG. 12 by step 1102 and the operation of assigning a value of Y to the physical resource block (PRB) physical uplink control channel (PUCCH) value for cell ID equal to 2 is shown in FIG. 12 by step 1103. Thus the base station can ensure that the physical uplink control channel resources are configured in the same physical resource blocks and that CCEs are allocated in such a way that there are not two user equipments taking the same physical uplink control channel resource.

In other words the controller can be configured to coordinate the resource assignments for UEs using different or multiple cell identification values to avoid severe interference, for example the user equipment 101 and 102 can reuse similar or same physical uplink control channel physical resource blocks for feedback since they are far away from each other. However the user equipment 103 requires a separate resource block from both the user equipment 101 and 102 as UE 103 is close to both US 101 and UE 102.

Furthermore for acknowledgment or no acknowledgement (ACK/NACK) feedback, independent of which cell ID a user equipment receives the physical downlink control channel from, the controller can control the UE to transmit the acknowledgment and no acknowledgment messages following the assigned uplink cell identification value.

In such a manner the physical uplink control channel for the pico cell and macro cell can be merged to a single coordinated physical uplink channel which can be used by both Pcells on macro and Pcells on pico and when the user equipment closest to the pico, the path loss to the pico is used for controlling power such that interference is minimised and the user equipment battery life is extended.

Figure 13:
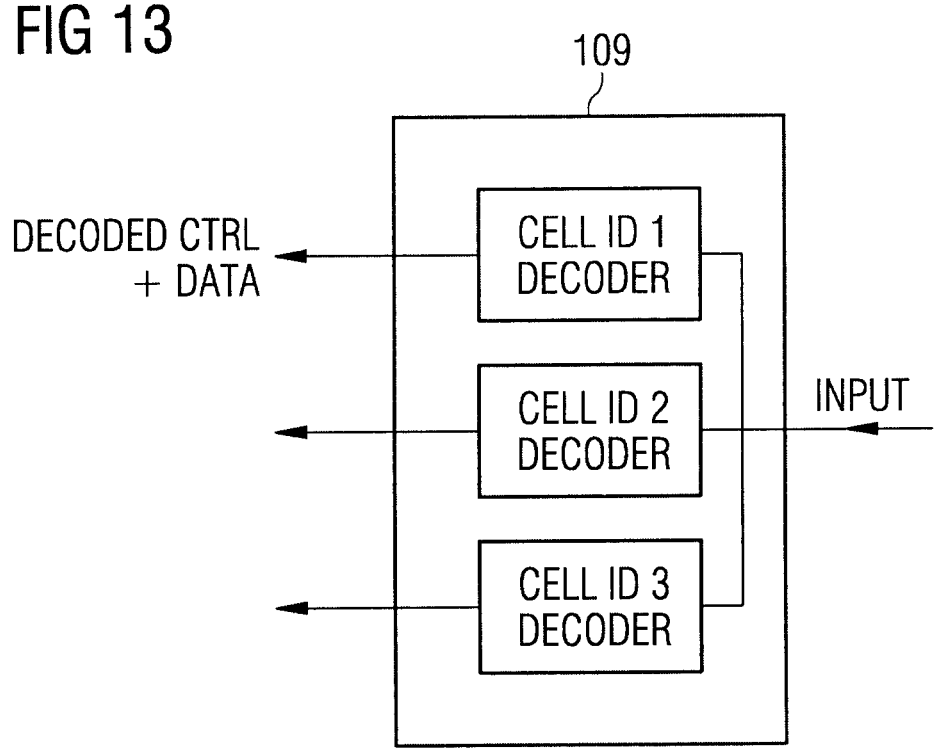
FIG. 13 shows a schematic diagram of the control apparatus according to some embodiments.

With respect to FIG. 13 an example of the controller configured to receive signal information is shown whereby the controller 109 receives signal data and filters it according to the cell ID value to output separate streams of control and data.

It is noted that whilst embodiments have been described in relation to LTE-Advanced, similar principles can be applied to any other communication system or indeed to further developments with LTE. Also, instead of carriers provided by a base station a carrier comprising may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein. In some other embodiments the aforementioned embodiments can be adopted to orthogonal frequency division multiple access (OFDMA) frequency division duplex (FDD) based mobile communication system other than LTE.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the communication device, base station and/or control apparatus such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
   monitoring, by a user equipment, at least one control channel from a macro base station, wherein the at least one control channel provides information indicating to the user equipment and allowing the user equipment to communicate in uplink with a non-macro base station, said information including at least a carrier ID field value of the non-macro base station;
   receiving the information at the user equipment in downlink from the macro base station, said information being contained within a downlink control signaling, said information further including transmit power control commands to be used by the user equipment;
   sending a physical uplink control channel message to the macro base station based on the transmit power control commands;
   receiving an adjusted/modified transmission power control command value from the macro base station for use in communicating with the non-macro base station; and
   communicating by the user equipment in uplink with the non-macro base station based on the adjusted/modified transmission power control command value,
   whereby the user equipment receives downlink transmissions from the macro base station and sends uplink transmissions to the non-macro base station to actively decouple uplink and downlink cell selection to permit separate optimizations for uplink and downlink communications.

2. A computer program product comprising a non-transitory computer-readable storage medium bearing computer executable instructions for use with a computer which when run on the computer cause the computer to perform the method of claim 1.

3. A method comprising:
   transmitting information to a user equipment in downlink from a macro base station in at least one control channel to be monitored by the user equipment, the information indicating to the user equipment and allowing the user equipment to communicate in uplink with a non-macro base station, said information being contained within a downlink control signaling and including at least a carrier ID field value of the non-macro base station, said information further including transmit power control commands to be used by the user equipment;
   receiving a physical uplink control channel message from the user equipment based on the transmit power control commands; and
   sending an adjusted/modified transmission power control command value to the user equipment for use in communicating with the non-macro base station,
   whereby the user equipment receives downlink transmissions from the macro base station and sends uplink transmissions to the non-macro base station to actively decouple uplink and downlink cell selection to permit separate optimizations for uplink and downlink communications.

4. The method as claimed in claim 3, wherein the information allowing the user equipment to communicate with the non-macro base station in uplink is contained within a downlink control information message and further comprises at least one of:
   a cell ID value; and
   a transmission power setting.

5. A computer program product comprising a non-transitory computer-readable storage medium bearing computer executable instructions for use with a computer which when run on the computer cause the computer to perform the method of claim 3.

6. An apparatus comprising:
   at least one processor; and
   at least one memory including computer program code, the at least one memory and computer program code configured, with the at least one processor, to cause the apparatus to perform at least the following:
   monitor at least one control channel from a macro base station, wherein the at least one control channel provides information indicating to the apparatus and allowing the apparatus to communicate in uplink with a non-macro base station, said information including at least a carrier ID field value of the non-macro base station;
   receive the information in downlink from the macro base station, said information being contained within a downlink control signaling said information further including transmit power control commands to be used by the user equipment;
   send a physical uplink control channel message to the macro base station based on the transmit power control commands;
   receive an adjusted/modified transmission power control command value from the macro base station for use in communicating with the non-macro base station; and
   communicate with the non-macro base station based on the adjusted/modified transmission power control command value,
   whereby the apparatus receives downlink transmissions from the macro base station and sends uplink transmissions to the non-macro base station to actively decouple uplink and downlink cell selection to permit separate optimizations for uplink and downlink communications.

7. The apparatus as claimed in claim 6, wherein the information allowing the apparatus to communicate with the non-macro base station is contained within a downlink control information message and further comprises at least one of:
 a cell ID value; and
 a transmission power setting.

8. The apparatus as claimed in claim 6, wherein the at least one memory and computer program code are further configured, with the at least one processor, to cause the apparatus to perform:
 associating each of the macro and non-macro base stations with one or more logical cell values, each logical cell being associated to a carrier resource and at least two logical cells associated to the same carrier resource.

9. The apparatus as claimed in claim 8, wherein the carrier resource comprises at least one of:
 time period;
 frequency;
 code; and
 spatial coding.

10. The apparatus as claimed in claim 8, wherein the at least one memory and computer program code are further configured, with the at least one processor, to cause the apparatus to perform:
 associating the apparatus with a logical cell value, wherein the apparatus associated logical cell value is decoupled from the logical cell value associated with the macro or non-macro base station to which the apparatus is configured to transmit.

11. An apparatus comprising:
 at least one processor; and
 at least one memory including computer program code, the at least one memory and computer program code configured, with the at least one processor, to cause the apparatus to:
 transmit information to a user equipment in downlink in at least one control channel to be monitored by the user equipment, the apparatus being a macro base station, the information indicating to the user equipment and allowing the user equipment to communicate in uplink with a non-macro base station, said information being contained within a downlink control signaling and including at least a carrier ID field value of the non-macro base station, said information further including transmit power control commands to be used by the user equipment; and
 receive a physical uplink control channel message from the user equipment based on the transmit power control commands; and
 send an adjusted/modified transmission power control command value to the user equipment for use in communicating with the non-macro base station,
 whereby the user equipment receives downlink transmissions from the macro base station and sends uplink transmissions to the non-macro base station to actively decouple uplink and downlink cell selection to permit separate optimizations for uplink and downlink communications.

12. The apparatus as claimed in claim 11, wherein the information allowing the user equipment to communicate with the non-macro base station in uplink is contained within a downlink control information message and further comprises at least one of:
 a cell ID value; and
 a transmission power setting.

13. The apparatus as claimed in claim 11, wherein the at least one memory and computer program code are further configured, with the at least one processor, to cause the apparatus to perform:
 associating each of the macro and non-macro base stations with one or more logical cell values, each logical cell being associated to a carrier resource and at least two logical cells associated to the same carrier resource.

14. The apparatus as claimed in claim 13, wherein the carrier resource comprises at least one of:
 time period;
 frequency;
 code; and
 spatial coding.

15. The apparatus as claimed in claim 13, wherein the at least one memory and computer program code are further configured, with the at least one processor, to cause the apparatus to perform:
 associating the user equipment with a logical cell value, wherein the user equipment associated logical cell value is decoupled from the logical cell value associated with the macro or non-macro base station to which the user equipment is configured to transmit.

* * * * *